United States Patent [19]

Iyer et al.

[11] Patent Number: 5,242,631
[45] Date of Patent: Sep. 7, 1993

[54] METHOD FOR COATING NUCLEAR FUEL PELLETS

[75] Inventors: Jayashri N. Iyer, Columbia, S.C.; Deborah P. Partlow, Forest Hills, Pa.

[73] Assignee: Westinghouse Electric Corp., Pittsburgh, Pa.

[21] Appl. No.: 819,902

[22] Filed: Jan. 13, 1992

[51] Int. Cl.$^5$ .................. G21C 3/00; G21C 21/00
[52] U.S. Cl. .................. 264/0.5; 376/419; 376/339; 427/6
[58] Field of Search .......... 376/339, 419; 264/0.5; 427/6

[56] References Cited

U.S. PATENT DOCUMENTS

| | | | |
|---|---|---|---|
| 3,427,222 | 2/1969 | Biancheria et al. | 176/68 |
| 3,862,908 | 1/1975 | Fitch et al. | 252/301.1 S |
| 3,917,768 | 11/1975 | Abate-Daga et al. | 264/0.5 |
| 4,006,096 | 2/1977 | Forthmann et al. | 252/301 |
| 4,048,090 | 9/1977 | Hannerz | 252/301 |
| 4,110,159 | 8/1978 | Lee | 176/68 |
| 4,587,088 | 5/1986 | Radford | 376/419 |
| 4,683,114 | 7/1987 | Ho et al. | 376/419 |
| 4,871,479 | 10/1989 | Bachelard et al. | 264/0.5 X |
| 4,990,303 | 2/1991 | Bryan et al. | 376/419 |
| 5,075,075 | 12/1991 | Kapil | 376/419 |

OTHER PUBLICATIONS

Partlow et al., "Colloidal Versus Polymer Gels and Monolithic Transformation in Glass-Forming Systems", 46 Journal of Non-Crystalline Solids, 153-161 (1981).

Primary Examiner—Peter A. Nelson

[57] ABSTRACT

A method for coating a nuclear fuel pellet is provided in which a liquid sol is formed containing the makings of a rare earth metal oxide. The liquid sol is applied to the exterior surface of the nuclear fuel pellet and the pellet is baked to form a solid coated pellet. If desired, zirconium diboride may be dispersed within the rare earth metal oxide matrix. Preferably, the rare earth metal oxide is either erbium oxide or gadolinia.

13 Claims, No Drawings

METHOD FOR COATING NUCLEAR FUEL PELLETS

BACKGROUND OF THE INVENTION

1. Field of the Invention

The present invention is directed to a method for coating nuclear fuel pellets and more particularly to a method for coating nuclear fuel pellets utilizing a metal oxide formed in accordance with the sol-gel process.

2. Description of the Prior Art

At present, nuclear fuel pellets, generally composed of uranium oxide ($UO_2$), are coated with zirconium diboride ($ZrB_2$) to produce integral nuclear fuel burnable absorbers. The zirconium diboride coating is applied to the fuel pellets in order to absorb the neutrons released during the burning of the fuel, and thereby provide control of core excess reactivity in the beginning of the fuel cycle.

In operation, fuel rods are produced by packing the coated nuclear fuel pellets in long cylindrical containers. These cylindrical fuel rods are then inserted into the nuclear reactor core to supply the fuel for the nuclear reactor.

When the nuclear fuel pellets coated with zirconium diboride are irradiated in the reactor, the boron in the coating is decomposed into lithium and helium. As the boron decomposes, helium is generated and released into the plenum in the fuel rod. Thus, use of integral fuel burnable absorber rods causes additional rod internal pressure due to the generation of helium during irradiation, as compared to standard fuel rods. As nuclear plants seek higher burnups, longer fuel cycles, and greater fuel enrichment, there will be a need for greater reactivity control during the beginning of the fuel cycle. If this were to be achieved with increased zirconium diboride loading, there will be a substantial increase in rod internal pressure due to helium generated from B-10 transmutation during irradiation, which in turn will limit the life of the integral fuel burnable absorber rods. In order to achieve increased reactivity control while reducing the end of life rod internal pressure, an alternative absorber coating is needed, which will reduce helium generation.

A zirconium diboride coating is usually applied to the uranium oxide fuel pellet by means of a sputtering process. This necessitates vacuum deposition which is time-consuming and costly. Zirconium diboride target preparation for the coating is expensive. In addition, the equipment necessary for carrying out the sputtering process and pumping necessary to produce the vacuum create expensive capital and operating costs. Moreover, the thickness of a coating applied by means of a sputtering process cannot be consistently maintained nor can a sputtering process be used to apply a coating on an irregular-shaped surface. Consequently, there is a need for an improved process for applying a coating on a nuclear fuel pellet.

SUMMARY OF THE INVENTION

In the present invention, nuclear fuel pellets are coated using the sol-gel process. A liquid sol is formed containing the makings of a metal oxide. While still in a liquid state, the metal oxide sol is applied to the exterior surface of the uranium oxide fuel pellet. The liquid-coated pellet is baked to form a nuclear fuel pellet coated with a metal oxide material. Preferably, the metal oxide used to form the matrix of the sol is an oxide of a rare earth metal, particularly, erbium or gadolinium.

If desired, zirconium diboride may be dispersed within the metal oxide matrix of the sol. Because zirconium diboride is not an oxide, it cannot be applied by itself in accordance with the sol-gel process. However, the neutron absorption properties of zirconium diboride can be utilized in an erbium oxide or gadolinium oxide sol by dispersing the zirconium diboride in the metal oxide during the formation of the sol.

DESCRIPTION OF THE PREFERRED EMBODIMENT

An advanced integral fuel burnable absorber is provided which consists of a mixture of erbium oxide ($Er_2O_3$) and zirconium diboride coated onto uranium oxide fuel pellets. The mixture of the erbium oxide and zirconium diboride provide enhanced power distribution capability to the fuel pellet.

A reproducible mixture of zirconium diboride and erbium oxide is difficult to apply to a uranium oxide pellet by sputtering because of the variability of the sputtering rates and sticking coefficients for the various desired species. In addition, the sputtering process requires expensive target fabrication and high vacuum, which entails expensive equipment and long pump down delays. These problems are avoided in the present invention by providing a dispersion of zirconium diboride powder in an erbium oxide coating and applying that coating to the uranium oxide fuel pellet using the sol-gel process.

In the sol-gel process, a glass or ceramic material is prepared without a melting or sintering process. The only criteria for applying the sol-gel process is that a liquid precursor must be able to be converted to a gelatinous state. When the solution is used for coating purposes, the solution is deposited prior to gelling.

Two kinds of sol-gel solutions can be used to make coatings. They are aqueous solutions and non-aqueous solutions. The aqueous solutions are actually suspensions of colloidal size particles which are made from salts, such as acetates, nitrates, and chlorides, containing the desired metal or metals. These suspensions are formed by mixing the salt with water to form a very fine precipitate. Addition of a suitable electrolyte such as acetic acid causes the particles to become charged. Because of the mutual repulsion of the charged particles, a translucent suspension is formed. The viscosity of the suspension is controlled by adding or evaporating water. If too much water is removed, a clear gel forms which cannot be deposited as a coating. When the process is properly controlled, objects such as fuel pellets are coated with the liquid sol by simple means such as spraying or dipping. Coating thickness can be controlled extremely accurately within approximately 50 Angstroms by controlling the liquid sol viscosity and the rate used to withdraw the fuel pellets from the sol when they are dipped. The dry coating is converted to a pure oxide state by heating the coated fuel pellet to 200° C. or higher, depending on the application.

For a non-aqueous sol-gel solution, an organometallic chemical containing the desired metals is used as a starting material. This chemical can be converted to a polymer which remains soluble in a nonaqueous solvent such as alcohol. The polymer solution is water-clear in appearance. Gelation is caused by evaporation of the solvent or, in some cases, by continued polymerization until the intertwining molecules prevent free motion. In the coating process, objects are coated with the non-aqueous liquid solution by spraying or dipping. Coatings similar to those from an aqueous solution can be obtained. To completely remove the organic portion of the non-aqueous solution, the coated particle must be heated in a oxidizing atmosphere. Otherwise, carbon will remain in the coating, which may not be acceptable depending on the application.

The use of a sol-gel coating process over traditional coating techniques provides many advantages. The sol-gel coating process is inexpensive and uses simple equipment under ambient conditions. The sol-gel coating process is very reproducible and can be used to deposit films of excellent chemical homogeneity and purity. The sol-gel coating process can easily be used to coat substrates of odd shapes and it can be used to coat very large substrates as well.

A sol-gel solution formed from a rare-earth metal oxide provides a suitable coating for neutron absorption in the nuclear fuel pellet. Preferably, the rare earth metal oxide used is erbium oxide. In an erbium oxide coating, the erbium performs the same function as the boron in the zirconium diboride coating. The erbium absorbs the neutrons released during the burning of the nuclear fuel. However, erbium transmutes into other erbium isotopes and does not produce helium, such as in the case of boron. Because an erbium oxide coating does not produce helium, the irradiation of an erbium oxide coating does not increase the internal pressure of the nuclear fuel rod. Consequently, a nuclear fuel rod containing fuel pellets coated with erbium oxide can achieve greater reactivity control and higher burnup than fuel pellets coated with zirconium diboride. In addition, gadolinium oxide ($GdO_2$) can be used as the rare earth metal oxide with the same benefits and results as erbium oxide.

If desired, zirconium diboride can be used in conjunction with erbium oxide in the coating. However, because zirconium diboride is not an oxide, it cannot be deposited in a straightforward manner by the sol-gel method. However, if zirconium diboride is incorporated as a fine powder suspended in a relatively viscous sol-gel erbium oxide solution, the combined zirconium diboride and erbium oxide coating can be applied in accordance with the present method. The zirconium diboride is added to the erbium oxide sol-gel solution at a stage in the sol-gel process in which the viscosity of the solution is such that a fine zirconium diboride powder is suspended. A zirconium diboride/erbium oxide coating provides equivalent neutron absorption properties as a pure zirconium diboride coating. However, since less zirconium diboride is decomposed, less helium is generated for each unit of fuel that is burned. Consequently, a zirconium diboride/erbium oxide coating permits greater enrichment of fuel and higher burnups than that achieved by a zirconium diboride coating.

The present method provides a better, more cost effective way of applying coatings to uranium oxide fuel pellets. The process has the added benefit of providing greater manufacturing flexibility, since large variations in production load are easily accommodated. In fact, the present invention can be performed in a continuous operation utilizing inexpensive equipment. The present method is fully amenable to being automated.

While we have described a present preferred embodiment of the invention, it is to be distinctly understood that the invention is not limited thereto but may be otherwise embodied and practiced within the scope of the following claims.

We claim:

1. A method for coating a nuclear fuel pellet comprising the steps of:
  a. forming a liquid sol comprising at least one rare earth metal oxide wherein a fine powder of zirconium diboride is suspended therein;
  b. applying said liquid sol to the exterior surface of said fuel pellet to form a liquid-coated pellet; and
  c. baking said liquid-coated pellet to form a solid-coated pellet.

2. The method of claim 1 wherein said sol is applied to said fuel pellet by dipping said pellet into said sol.

3. The method of claim 1 wherein said sol is applied to said fuel pellet by spraying said pellet with said sol.

4. The method of claim 1 wherein a thin film of said sol is deposited onto said pellet.

5. The method of claim 1 wherein said at least one rare earth metal oxide is at least one of erbium oxide and gadolinium oxide.

6. A coating for a nuclear fuel pellet comprising erbium oxide, said coating formed as a liquid sol and applied to the exterior surface of said uranium oxide pellet.

7. The method of claim 1 wherein said zirconium diboride powder is added to said liquid sol when the viscosity of said liquid sol is such that a powder of zirconium diboride can be suspended therein.

8. The method of claim 1 wherein said at least one rare earth metal oxide is at least one of erbium oxide and gadolinium oxide.

9. A nuclear fuel pellet comprising a uranium oxide pellet coated with at least one rare earth metal oxide wherein zirconium diboride is dispersed within said at least one rare earth metal oxide, said coating formed as a liquid sol and applied to the exterior surface of said uranium oxide pellet.

10. The nuclear fuel pellet of claim 9 wherein said at least one rare earth metal oxide is at least one of erbium oxide and gadolinium oxide.

11. The nuclear fuel pellet of claim 9 wherein said at least one rare earth metal oxide is at least one of erbium oxide and gadolinium oxide.

12. The coating of claim 6 wherein zirconium diboride is dispersed within said at least one rare earth metal oxide.

13. A method for coating a nuclear fuel pellet comprising the steps of:
  (a) forming a liquid sol comprising erbium oxide;
  (b) applying said liquid sol to the exterior surface of said fuel pellet to form a liquid-coated pellet; and
  (c) baking said liquid-coated pellet to form a solid-coated pellet.

* * * * *